Figure 1:
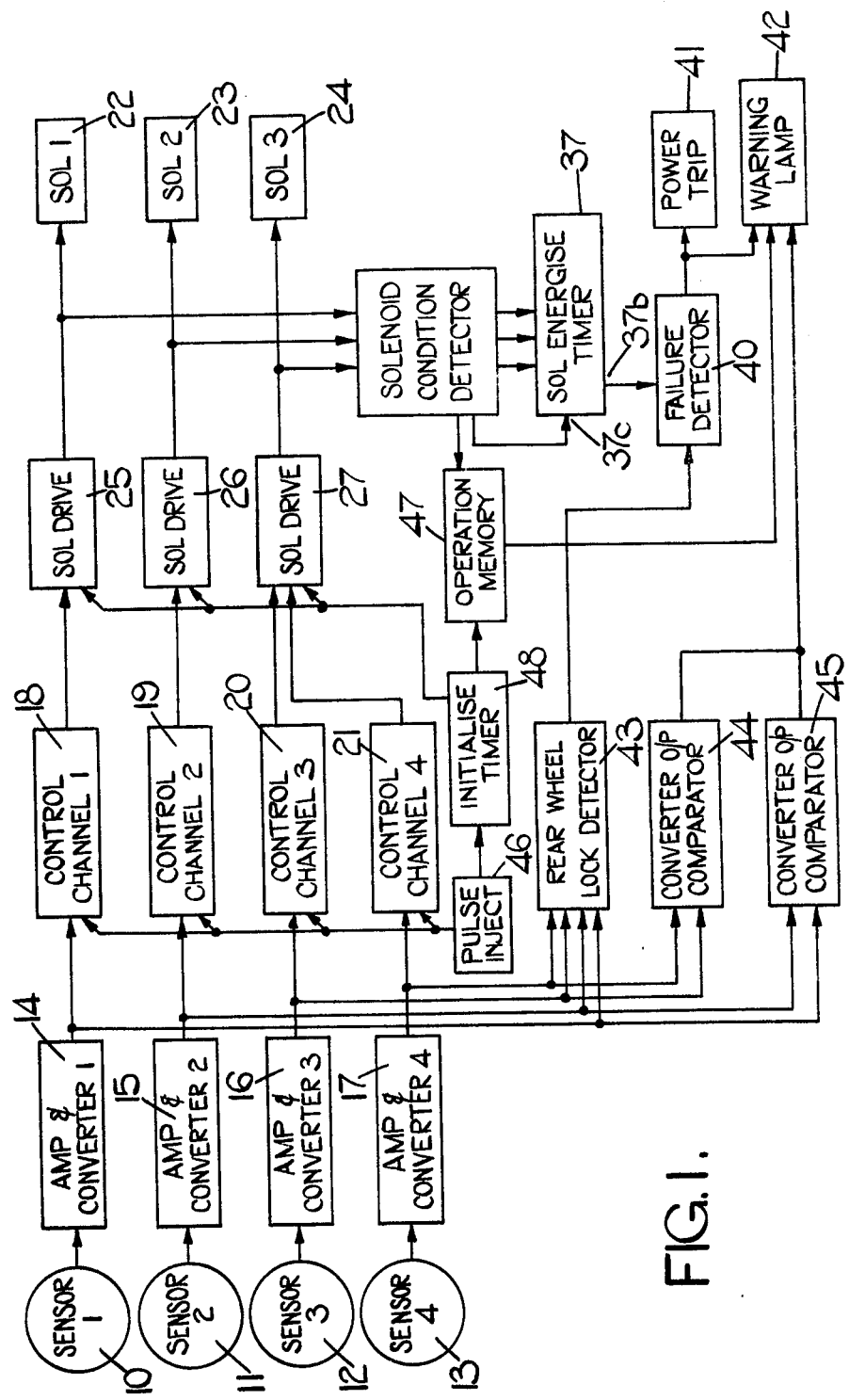

United States Patent [19]

Brearley

[11] 4,106,821

[45] Aug. 15, 1978

[54] FAILURE DETECTION CIRCUIT FOR A VEHICLE ANTI-SKID BRAKING SYSTEM

[75] Inventor: Malcolm Brearley, Solihull, England

[73] Assignee: Girling Limited, Birmingham, England

[21] Appl. No.: 730,423

[22] Filed: Oct. 7, 1976

[30] Foreign Application Priority Data

Oct. 1, 1975 [GB] United Kingdom ............... 40084/75

[51] Int. Cl.² ............................................. B60T 8/00
[52] U.S. Cl. ......................................... 303/92; 303/96
[58] Field of Search ................................... 303/92, 96

[56] References Cited

U.S. PATENT DOCUMENTS

| 3,680,923 | 8/1972 | Peterson | 303/92 |
| 3,841,712 | 10/1974 | Syria | 303/92 |
| 3,861,755 | 1/1975 | Taylor | 303/92 |
| 3,920,284 | 11/1975 | Lane | 303/92 |
| 3,944,288 | 3/1976 | Bertolasi | 303/92 |
| 3,995,912 | 12/1976 | McNinch | 303/92 |

FOREIGN PATENT DOCUMENTS 1,401,581 6/1973 United Kingdom ..................... 303/92

Primary Examiner—Trygve M. Blix
Assistant Examiner—Reinhard J. Eisenzopf
Attorney, Agent, or Firm—Andrus, Sceales, Starke & Sawall

[57] ABSTRACT

An anti-skid braking system including a plurality of independent solenoid energizing circuits which are controlled in accordance with the outputs of sensors on separate wheels of a vehicle, has a failure detection circuit comprising a timer triggered into operation each time any one of the solenoids is energized, and reset when a back e.m.f. generated by the deactivation of any solenoid is detected. If the timer is not reset within a fixed period the system is disabled and a warning lamp is energized. The system also includes a circuit utilizing the back e.m.f. signals for testing the system each time it is switched on.

9 Claims, 2 Drawing Figures

FIG. I.

FAILURE DETECTION CIRCUIT FOR A VEHICLE ANTI-SKID BRAKING SYSTEM

It is known to control the brakes of individual wheels or pairs of wheels of a vehicle by means of a multi-channel anti-skid system which releases the brake for a particular wheel or pair of wheels when that wheel or pair of wheels decelerates too rapidly, or which releases the brake for a particular wheel or pair of wheels when that wheel or pair of wheels is rotating at a speed significantly less than the average wheel speed.

With such a system there is a danger that a failure in any channel of the system could cause the associated brake to be permanently disabled and this is obviously a dangerous condition. It is an object of the invention to provide a failure detection circuit for detecting such a condition.

A vehicle anti-skid braking system in accordance with the invention includes a plurality of wheel speed sensors, a plurality of wheel slip detection circuits associated with the respective wheel speed sensors, a plurality of brake release solenoids connected to the respective slip detection circuits so as to energise a solenoid if the corresponding slip detection circuit detects slippage of the associated wheel, and a failure detection circuit comprising solenoid energisation detection means connected to said solenoids and producing an output signal when any one of the solenoids is energised, a timing circuit connected to the solenoid energisation detection means so as to be triggered into operation thereby, warning means operable by said timing circuit if the latter remains in operation for more than a predetermined time, means for detecting the back e.m.f. produced when each solenoid is switched off, and timer circuit reset means controlled by said back e.m.f. detecting means for resetting the timer circuit when any solenoid is switched off.

The solenoids may be connected as the emitter loads of emitter follower power transistors forming the output stages of the detection circuits. In this case the solenoid energisation detector means may comprise an OR gate having its input terminals connected to the solenoid-emitter junctions. These junctions are preferably connected by biasing resistors to a signal source so that the junctions are normally held at a low voltage by current leakage through the resistor/solenoid circuits but the potential at a junction will change to provide an input signal to the OR gate if any solenoid becomes open circuit.

The back e.m.f. detecting means may also be used to supply a signal when all the solenoids are switched off simultaneously during a system switch-on check sequence. By means of a simple timer circuit the solenoids can be energised during initial switch-on for a short period and then inhibited simultaneously. An AND gate (which may consist quite simply of an array of diodes and a single resistor) detects the simultaneous appearance of the back e.m.f. signals and causes a warning lamp to be lit briefly to assure the driver of the vehicle that the warning lamp and the fault detection system is operative.

An example of the invention is shown in the accompanying drawings in which

Figure 2:
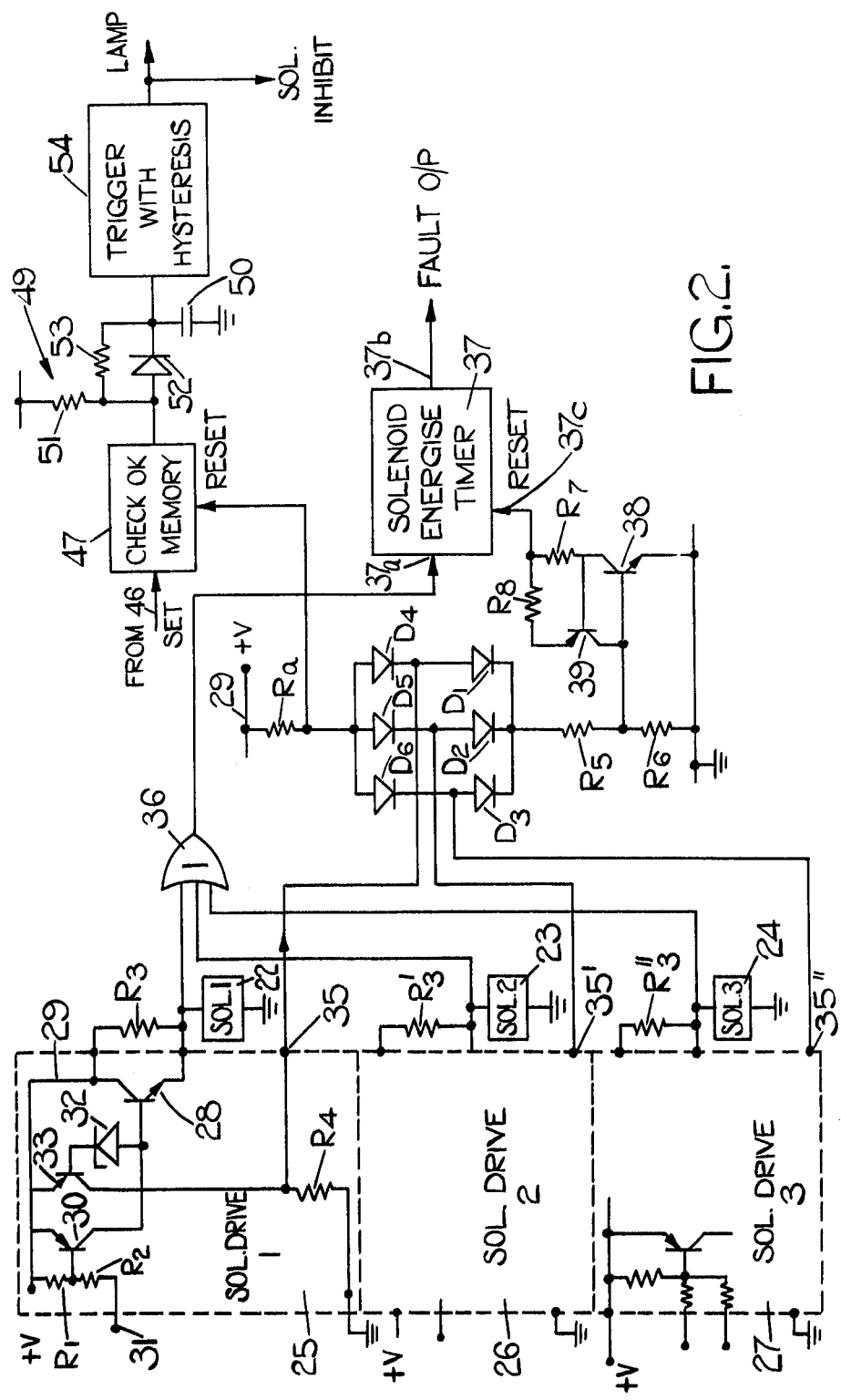

FIG. 1 is a block diagram of the complete anti-skid braking system for a vehicle and FIG. 2 is a more detailed circuit diagram of a failure detection circuit forming a part of the system.

Referring firstly to FIG. 1 the system, which is intended for a road vehicle has four wheel speed sensors 10, 11, 12, 13 which produce a.c. output signals of frequency proportional to the respective wheel speeds. Each sensor is connected to a amplifier/converter circuit 14, 15, 16 or 17 which amplifies the a.c. signal to clipping and converts it to a d.c. signal proportional to the frequency of the a.c. signal. The output of each amplifier/converter circuit is connected to a corresponding control channel 18, 19, 20 or 21 which includes a differentiating circuit and a threshold circuit such that when the d.c. output of the corresponding amplifier/converter falls at more than a predetermined rate the control channel produces an output signal.

There are three independently operable solenoids 22, 23, 24 driven by three drive circuits 25, 26, 27. The drive circuits 25 and 26 are connected respectively to the control channels 18 and 19 which are associated with the two front wheels of the vehicle and the corresponding solenoids 22, 23 when energised release the brakes associated with the respective front brakes. The drive circuit 27 is connected to both control channels 20 and 21 so that the solenoid 24 is energised to release both rear brakes when either rear wheel decelerates sufficiently rapidly to indicate incipient wheel slip.

Turning now to FIG. 2, the solenoid drive circuit 25 is shown in detail and the circuits 26, 27 are identical. The circuit 25 includes an n-p-n power transistor 28 connected as an emitter follower with the solenoid 22 as its emitter load. Thus the emitter of the transistor 28 is connected by the solenoid 22 to an earth rail and its collector connected to a positive supply rail 29. The base of the transistor 28 is connected to the collector of a p-n-p driver transistor 30, the emitter of which is connected to the rail 29. The base of the transistor 30 is connected to the common point of two resistors $R_1$, $R_2$ connected in series between an input terminal 31 (connected to the associated control channel) and the rail 29.

The base of the transistor 28 is also connected to the anode of a zener diode 32 the cathode of which is connected to the base of a p-n-p transistor 33 which has its emitter connected to the rail 29 and its collector connected to the earth rail via a resistor $R_4$ and also to a terminal 35.

A resistor $R_3$ is connected between the rail 29 and the emitter of the transistor 28 but is of sufficiently high ohmic value to prevent actuation of the solenoid 22.

An OR gate 36 has three input terminals connected to the emitter of the transistor 28 and to corresponding terminals of the circuits 26, 27 respectively, so that the gate 36 produces an output whenever any of the solenoids 22, 23, 24 is energised. In addition the gate 36 will produce an output if any of the solenoids 22, 23, 24 is open circuit, by virtue of the resistor $R_3$ and corresponding resistors $R_3'$ and $R_3''$ of the circuits 26, 27. The output of the gate 36 is connected to the input terminal 37a of an electronic timer circuit 37 of known form which produces an output at its output terminal 37b if a signal is maintained at its input terminal 37a for a predetermined time unless a signal is applied in the meantime to a reset terminal 37c.

The terminal 35 of the circuit 25 and corresponding terminals 35' and 35" of the circuits 26 and 27 are connected to the anodes of three diodes $D_1$, $D_2$ and $D_3$ which have their cathodes interconnected and connected by a resistor chain $R_5$, $R_6$ to the earth rail. The common point of the resistors $R_5$, $R_6$ is connected to the base of a n-p-n transistor 38 which has its emitter connected to the earth rail and its collector connected by a resistor $R_7$ to the reset terminal 37c. The terminal 37c is also connected by a resistor $R_8$ to the emitter of a p-n-p transistor 39 with its base connected to the collector of the transistor 38 and its collector connected to the base of the transistor 38. A pulse from any of the terminals 35, 35' and 35" will cause the transistor 38 to switch on and transistor 39 will latch transistor 38 on as long as current can flow from the reset terminal 37c.

In use, each time a solenoid 22, 23 or 24 is energised an input is delivered to the terminal 37a so that operation of the timer circuit commences. When the solenoid is deenergised current will continue to flow therein owing to its inductance and in these circumstances the potential at the emitter of the transistor 28 will go negative until the zener diode 32 breaks down and causes the transistor 33 to conduct. The transistor 28 now receives base current via the base-emitter junction of the transistor 33 and the zener diode and thus permits current to continue flowing through the solenoid until the energy stored thereby is dissipated. Thus the back e.m.f. generated by the solenoid 22 on de-energisation thereof is detected and for the duration of the dissipation of the energy therein a positive going signal appears at the terminal 35. This signal triggers the transistor 38 and resets the timer circuit 37. It will be appreciated that any solenoid being de-energised will reset the timer even though two or more of the solenoids were energised prior to resetting.

As shown in FIG. 1 an output at the terminal 37b operates a failure circuit 40 which both disables the whole anti-skid system via a power trip 41 and illuminates a warning lamp circuit 42. This will occur whenever the timer circuit 37 runs its predetermined time without being reset either as a result of a malfunction of the control channel/driver circuit or as a result of a solenoid going open circuit.

The system also includes various other check circuits for example a rear wheel lock detector circuit 43 which is connected to the failure circuit 40 both to disable the antiskid system and illuminates the lamp and two converter output comparators 44, 45 which compare the analogue signals from the converters 14, 15, 16, 17 and illuminate the lamp if these differ greatly.

Furthermore an arrangement is provided for testing the system each time it is switched on. This arrangement includes a test pulse generator 46 which applies a ramp waveform to the control channels 18, 19, 20 and 21 at switch-on and also sets a memory device 47 via a timer 48. A timing circuit 49 commences operation at the same time, a capacitor 50 being charged from the supply via a resistor 51 and a diode 52 bridged by a resistor 53. A short time after switch-on (e.g. 30mS) the voltage on capacitor 50 becomes sufficient to fire a trigger circuit 54 which lights the lamp circuit 42 and also applies a pulse simultaneously to all the drive circuits 25, 26, 27 to turn these off. Thus the terminals 35, 35', and 35" produce positive going output signals simultaneously and these reset the memory 47 via diodes $D_4$, $D_5$, $D_6$ having their cathodes connected to the terminals 35, 35' and 35" respectively and their anodes connected via a resistor $R_9$ to the rail and also to the memory 47. Resetting of the memory 47 causes the capacitor 50 to start discharging slowly via the resistor 53 until, after about one second the trigger circuit 54 resets, the lamp is extinguished and the solenoid inhibit signal is removed. During this period the lamp is noticeably checked and the solenoid drive disabled to prevent operation for longer than 30MS, even though the initial pulse may last for several hundred milliseconds and would otherwise remove all service braking for a dangerous duration at each switch on. Should the solenoid fail to switch off simultaneously the memory 47 is not reset and the trigger 54 does not reset, thereby leaving the solenoids inhibited and the anti-skid system disabled.

I claim:

1. An anti-skid braking system including a plurality of wheel speed sensors, a plurality of wheel slip detection circuits associated with the respective wheel speed sensors, a plurality of brake release solenoids connected to the respective slip detection circuits so as to energise a solenoid if the corresponding slip detection circuit detects slippage of the associated wheel, and a failure detection circuit comprising solenoid energisation detection means connected to said solenoids and producing an output signal when any one of the solenoids is energised, a timing circuit connected to the solenoid energisation detection means so as to be triggered into operation thereby, warning means operable by said timing circuit if the latter remains in operation for more than a predetermined time, means for detecting the back e.m.f. produced when each solenoid is switched off, and timer circuit reset means controlled by said back e.m.f. detecting means for resetting the timer circuit when any solenoid is switched off.

2. A system as claimed in claim 1 wherein said detection circuit includes power transistors of the emitter follower type, with the solenoids connected as emitter loads of the respective power transistors, said solenoid energisation detector means comprising an OR gate having its inputs connected to the solenoid-emitter junctions.

3. A system as claimed in claim 2 in which said solenoid-emitter junctions are connected by respective biasing resistors to a signal source so that the junctions are normally held at a low voltage by current leakage through the resistor/solenoid circuits, but the potential at a junction will change to provide an input signal to the OR gate if any solenoid becomes open circuit.

4. A system as claimed in claim 2 in which the back e.m.f. detection means includes a further transistor of opposite conductivity type to the emitter follower power transistor with its emitter connected to the collector of the power transistor, its base connected by a Zener diode to the base of the power transistor and its collector connected by a load resistor to ground, the Zener diode breaking down when there is a back e.m.f. induced in the solenoid at switch off thereof so that base current to the power transistor flows through the emitter-base of the further transistor and the Zener diode, thereby turning on the further transistor and creating a potential difference across the load resistor.

5. A system as claimed in claim 1 further comprising a power trip operated by said timer circuit and arranged to disable the system in the event of the timer circuit producing a fault indicating output.

6. A system as claimed in claim 1, including test means for engaging the solenoids briefly each time the system is switched on and for simultaneously de-energising the solenoids, and means for illuminating a warning lamp for a period, said lamps remaining illuminated if the back e.m.f. detecting means do not simultaneously produce an output signal.

7. A system as claimed in claim 6, in which said test means includes a pulse generator connected to all the slip détection circuits and arranged to apply thereto a ramp input simulating an all-wheel skid condition, a further timer circuit arranged to produce an output for inhibiting the detection circuits and also for illuminating said warning lamp, and memory means sensitive to the outputs of the back e.m.f. detecting means to initiate resetting of the further timer circuit to de-inhibit the detector circuits and turn off said lamp after a delay follower receipt of simultaneous signals from said back e.m.f. detecting means.

8. A system as claimed in claim 7, in which the further timer circuit comprises a resistor-capacitor circuit including a diode connected to decrease the charging time constant of the circuit relative to the discharging time constant thereof, said circuit being connected to a power supply rail to provide a charging path and to said memory means which provides a discharge path and a trigger circuit with hysteresis controlled by the voltage on said capacitor.

9. An anti-skid braking system, comprising a wheel sensor providing an output in response to wheel speed, means operatively connected to said sensor output and providing a slippage output in response to sensed wheel slippage, coil means operatively connected to said slippage means and selectively energized in response to said slippage output to provide a brake control output, means operatively connected to said coil means and selectively providing a timing sequence in response to the energisation of said coil means and providing a warning output in response to a timing sequence of a predetermined duration, detecting means operatively connected to said coil means and providing a back e.m.f. responsive output in response to the deactivation of said coil means, and reset means operatively connected to said detecting means and resetting said timing sequence of said timing means in response to said back e.m.f. responsive output.

* * * * *